United States Patent
Hadad et al.

(10) Patent No.: US 7,904,540 B2
(45) Date of Patent: Mar. 8, 2011

(54) SYSTEM AND METHOD FOR DEPLOYING VIRTUAL MACHINES IN A COMPUTING ENVIRONMENT

(75) Inventors: Erez Hadad, Nahariya (IL); Yosef Moatti, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/409,548

(22) Filed: Mar. 24, 2009

(65) Prior Publication Data
US 2010/0250744 A1    Sep. 30, 2010

(51) Int. Cl.
G06F 15/173 (2006.01)
G06F 9/455 (2006.01)
G06F 9/46 (2006.01)
G06F 1/00 (2006.01)

(52) U.S. Cl. ............ 709/223; 709/226; 718/1; 718/105; 713/323

(58) Field of Classification Search .................. 709/223, 709/226; 718/1, 105; 713/323
See application file for complete search history.

(56) References Cited

U.S. PATENT DOCUMENTS

| 6,990,437 | B1 | 1/2006 | Abu El Ata |
| 2005/0198244 | A1 | 9/2005 | Eilam et al. |
| 2005/0204358 | A1 | 9/2005 | Hellerstein et al. |
| 2006/0224550 | A1 | 10/2006 | Gopisetty et al. |
| 2007/0094670 | A1 | 4/2007 | Graves |
| 2009/0070771 | A1* | 3/2009 | Yuyitung et al. ............... 718/105 |
| 2010/0161805 | A1* | 6/2010 | Yoshizawa et al. ........... 709/226 |

FOREIGN PATENT DOCUMENTS

JP  2001319129 A  11/2001
WO  WO 2007/143395 A2  12/2007

* cited by examiner

*Primary Examiner* — Philip C Lee
(74) *Attorney, Agent, or Firm* — Scully, Scott, Murphy & Presser, P.C.; Yoav Alkalay, Esq.

(57) ABSTRACT

A system and method for planning placement of virtual machines VMs in a computing environment comprising a set of hosting machines HM. The method includes constructing a bipartite directed graph-based model that represents both a current and a target placement states, both including virtual machine nodes v in VM and nodes h in HM. Using a technique of graph pruning, the method iteratively generates a plan for achieving a desired target placement starting from the current placement without temporarily violating any policy or resource constraint. The application of the pruning algorithm to VM deployment automation necessarily defines a new model. The methodology employed safely manages concurrent changes in a datacenter, so that the environment can adjust faster to changing constraints. Furthermore, the present invention allows detection of migration cycles, caused by deadlocked combinations of capacity and policy constraints, and resolving them.

23 Claims, 10 Drawing Sheets

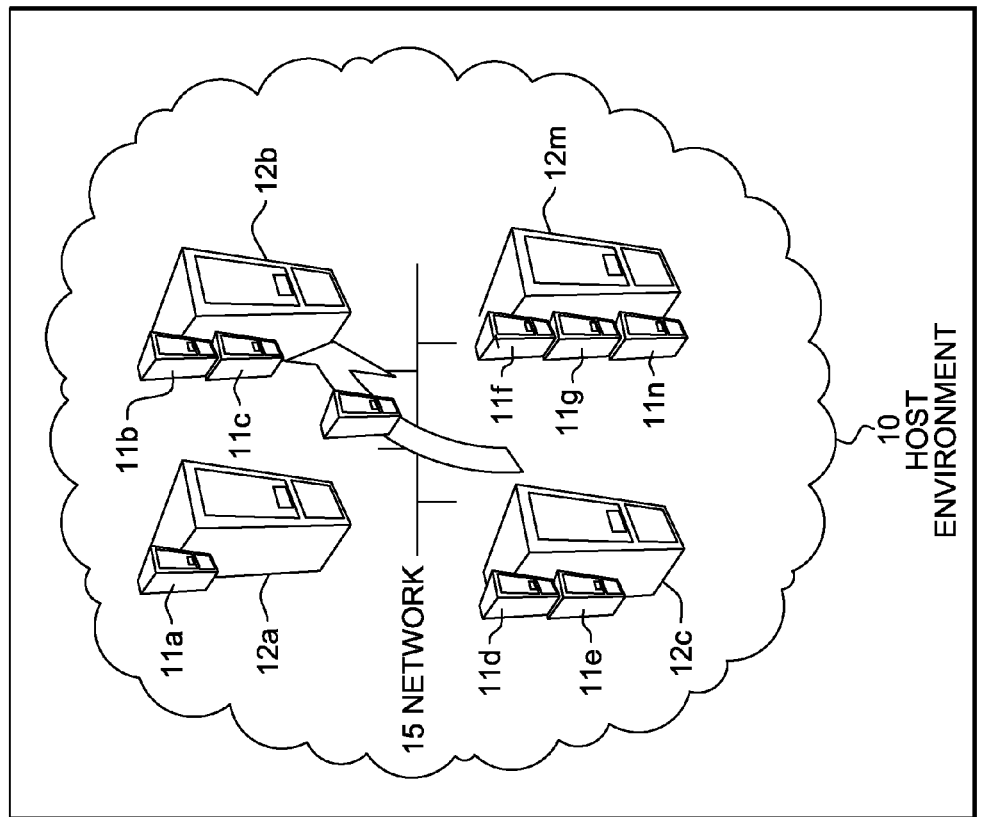
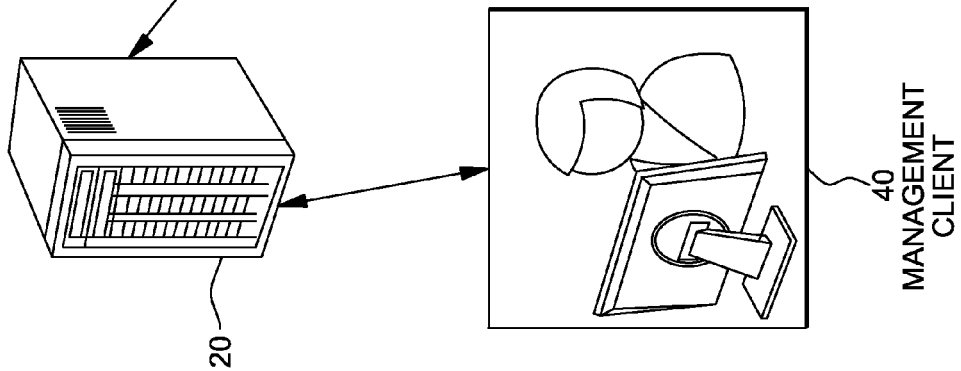
FIG. 1

1. let A = {}                    // A is the set of abused VMs
2. let rescan = TRUE    // rescan is a flag that commands the continuation of the outer loop
3. while rescan do
   3.1 let rescan = FALSE        // no next iteration unless this iteration generates progress
   3.2 let D = HV // D is the set of hosts to be processed in the next iteration of the inner (optimized) loop
   3.3 while D ≠ {} do
       3.3.1 let ND = {}         // the value of D in the next iteration
       3.3.2 for every HM h ∈ D do
             3.3.2.1 for every edge (v,h) do
                     3.3.2.1.1 if try_place(v, tp(v)) == TRUE then    // by construction hp(tp(v)) == h
                               3.3.2.1.1.1 prune_vm(v)       // finally placed VMs are pruned
                               3.3.2.1.1.2 let rescan = TRUE  // progress – may rescan all hosts
       3.3.3 Let C = {h | in(h) == 0}    // prune host nodes that have no more pending VMs
       3.3.4 Let ND = ND \ C              // prune from the next iteration
       3.3.5 Let HV = HV \ C              // prune from the graph
       3.3.6 For every h in C:
             3.3.6.1 for every edge (h,v) ∈ E do
                     3.3.6.1.1 E = E \ {(h,v)}    // remove all edges (h,v) from E
       3.3.7 if ND == {} then
             3.3.7.1 if VV ≠ {} then    // no more HMs to scan but still un-pruned VMs - deadlock
                     3.3.7.1.1 if rescan == FALSE then
                               3.3.7.1.1.1 if abuse(VV) == FALSE then
                                           3.3.7.1.1.1.1 return NO_PLAN
                     3.3.7.2 else   // VV is also empty – done.
                             3.3.7.2.1 let rescan = FALSE    // force exit of the outer loop as well
       3.3.8 let D = ND
4. return plan

MAIN ALGORITHM

FIG. 3

60 try_place(VM v, PLACEMENT_ELEMENT newPlv):
1. Define placement cp'() s.t.:
   for all v'≠v, let cp'(v') = mcp(v') and
   let cp'(v) = newPlv
   // (in other words, a hypothetical placement modifies the placement of v from mcp(v) to newPlv)
2. let PS = ap(v)
3. if mcp(v) ≠ @ then    // if v is currently placed on a HM, that HM's policies should also be checked
   3.1 let PS = PS ∪ ap(hp(mcp(v)))
4. if newPlv == @ then // if new current placement of v is not on a host, only check policies
   4.1 return check_policies(PS, cp')
5. let hpl = hp(newPlv) // if we got here, newPlv ≠ @ so v's target placement is on an actual host
6. if check_policies((PS ∪ ap(hpl)), cp') == TRUE AND
   $\Sigma${rp(cp'(w)) | VM w ∈ V s.t. hp(cp'(w))==hpl} ≤ cap(hpl) then // not exceeding capacity of hpl
   6.1 return TRUE
7. return FALSE

FIG. 4A

65 check_policies(SET<POLICY> PS, PLACEMENT pf):
1. for every p ∈ PS do
   1.1 if p(pf) == FALSE then
       1.1.1 return FALSE
2 return TRUE

FIG. 4B

67 rescan_host(PLACEMENT_ELEMENT pel):
1. if pel ≠ @ then
   1.1 let hpel = hp(pel)
   1.2 if hpel ∈ HV then
       1.2.1 ND = ND ∪ {hpel}
2. return

FIG. 4C

70 prune_vm(VM v):
// First, append a new step for v in the plan according to mcp(v) and tp(v)
1. if mcp(v) == @ AND tp(v) ≠ @ then:
    1.1 Generate step PLACE(v,hp(tp(v)),rp(tp(v))) to add to the plan
    1.2 prune_outgoing_edge(v,hp(tp(v)))
2. else if hp(mcp(v)) == hp(tp(v)) then:
    2.1 Generate step REALLOCATE(v,rp(tp(v))) to add to the plan
    2.2 prune_incoming_edge(v,hp(mcp(v)))
    2.3 prune_outgoing_edge(v,hp(tp(v)))
3. else       // hp(mcp(v)) ≠ hp(tp(v)) and both are not @
    3.1 Generate step RELOCATE(v,hp(tp(v)),rp(tp(v))) to add to the plan
    3.2 prune_incoming_edge(v, hp(mcp(v)))
    3.3 prune_outgoing_edge(v,hp(tp(v)))
4. let VV = VV \ {v}                  // remove node v from the graph
5. rescan_host(mcp(v))                // host placement changed – scan in the next iteration
6. rescan_host(tp(v))                 // host placement changed – scan in the next iteration
7. let mcp(v) = tp(v)                 // adjust the current placement
8. return

FIG. 5A prune_outgoing_edge(VM v , HM h):
1. let E = E \ {(v,h)}        // remove edge (v,h) from E  ⎫
2. return                                                   ⎬ 75
                                                            ⎭

FIG. 5B prune_INCOMING_edge(VM v , HM h):
1. let E = E \ {(h,v)}        // remove edge (h,v) from E  ⎫
2. return                                                   ⎬ 77
                                                            ⎭

FIG. 5C abuse(SET<VM> SV):
1. let AC = SV \ A            // set of VMs to scan for candidates - exclude previous abused VMs
2. while AC ≠ {} do:
   2.1 let v = select_abuse(AC)  ⎫
   2.2. if v == @ then            ⎬ 82
        2.2.1 return FALSE
   2.3 let AC = AC \ {v}       // v will not be scanned again in the current invocation
   2.3 if try_abuse(v) then
       ⎧ 2.3.1 A = A ∪ {v}     // v has just been abused, so it cannot be abused again
    84 ⎨ 2.3.2 rescan_host(tp(v))
       ⎩ 2.3.3 rescan_host(mcp(v))
         2.3.4 return TRUE
3. return FALSE

80

FIG. 6 select_abuse(SET<VM> SV):
91
1. Pick a VM v∈SV s.t. mcp(v) ≠ @ AND liveMigrate(v) == FALSE // avoid VMs that require live migration
2. if there is such v then
    2.1 return v
3. pick a VM v∈SV s.t. mcp(v) ≠ @
4. if there is such v then
    4.1 return v
5. return @ try_abuse(VM v):
92
1. if NOT try_place(v, @) then
    1.1 return FALSE
2. Append a "UNPLACE(v)" instruction to the plan
3. let mcp(v) = @
4. return TRUE

FIG. 7A select_abuse(SET<VM> SV):
1 pick a VM v∈SV s.t. mcp(v) ≠ @
2 if there is such v then
    2.1 return v
3. return @    // no suitable abuse candidate

95 try_abuse(VM v):
1. for every HM h∈PH do

96

1.1 if try_place(v, <h, rp(tp(v))>) == TRUE then  // try with the target resource allocation
    1.1.1 append a RELOCATE(v,h,rp(tp(v))) to the plan
    1.1.2 let mcp(v) = <h,rp(tp(v))>
    1.1.3 return TRUE  // solution found
  1.2 if try_place(v, <h, rp(mcp(v))>) == TRUE then  // try with the current resource allocation
    1.1.1 append a RELOCATE(v,h,rp(mcp(v))) to the plan
    1.1.2 let mcp(v) = <h,rp(mcp(v))>
    1.1.3 return TRUE  // solution found
2. return FALSE  // no solution

FIG. 7B

SYSTEM AND METHOD FOR DEPLOYING VIRTUAL MACHINES IN A COMPUTING ENVIRONMENT

FIELD OF THE INVENTION

The present disclosure relates generally to calculating and deploying of resource-consuming virtual entities, e.g., virtual machines, in computing environments, e.g., a datacenter or a "cloud" of distributed computing resources, and more particularly, to a system and method for dynamic managing placement (i.e., assignment of physical hosts and resources to VMs) of virtual machines (VMs) in computing environments from a first placement state into a given desired (target) placement state in a manner that adheres to a set of constraints.

BACKGROUND OF THE INVENTION

Solutions for the automated optimizing and transitioning of placements of multiple virtual machines (VMs), e.g., Xen® VMs (www.Xen.org) in a computing environment have only recently begun to be addressed by the industry, Current VMware® virtualization software products, such as Virtualization Infrastructure (VI) provide technology for enabling automated VM placement. However, none of the existing products is known to include a technology that uses similar concepts to those described in the present invention for automatic generation of a plan for changing the current placement of virtual machines in a datacenter of distributed computing resources into a given desired (target) placement. Moreover the resulting plan adheres to a set of constraints in the sense that no temporal state of deployment during plan execution (i.e., after the execution of each plan step) may violate a constraint.

US20050198244A1 entitled "Automatic provisioning of services based on a high level description and an infrastructure description" does not describe the placement of VMs in environments having distributed computing resources but to a deployment technique for provisioning of services. This reference describes generating a plan to allow deployment of a new service and then executing the plan. The plan generation aims to achieve a new resource allocation state that includes the new service. The plan implements an unordered set of provision actions whose application is restricted by preconditions, e.g., plan steps, whose application is restricted by policies and resource constraints. The described technique executes a forward-chaining type algorithm in its "Back End Generation" stage. However, there are several fundamental differences. First, the referenced technique is not based on a model of VMs, so it lacks the logic for generating VM-specific operations, such as "relocate", "suspend", etc. Also, being ignorant of migrations/relocations (that are not part of the service model), the referenced technique does not detect or resolve "migration cycles". Last, the referenced technique does not employ specific time-conserving optimizations (such as "follow the change", see below) that are not applicable to the service context in general but do apply to the VM placement model of the present invention.

US20050204358 describes a technique that addresses planning and scheduling change management requests in computing systems by calculating an optimal ordering of a set of tasks with certain inter-dependencies imposed by constraints such as collocation, anti-location ("exlocation") and resource capacity restrictions. This technique, however, is suited for scheduling of tasks for execution at servers, one at a time, for limited period of times, unlike the placement of VMs, which are placed effectively forever (unless a change is required), and that groups of VMs may be placed on the same server at the same time. Last, the referenced technique is tailored for specific types of constraints (collocation, exlocation, etc). In contrast, the present invention can be applied to any constraint that can be defined as a predicate function that can be evaluated over a placement.

US20070094670A1 entitled "Method and an apparatus for providing automatic emergency mode plan generation in a utility computing environment" describes a technique for automatically identifying types of failing resources that are required to a critical service and replacing them with matching resources that are allocated from reserve pools or confiscated from less critical services. It involves plan generation for resource allocation, but does not consider order of steps and does not deal with migration/allocation cycles.

US20060224550A1 entitled "Policy Based Resource Management for Legacy Data" describes a technique for moving data among storage resources according to specific policies. Again, while directed to automated planning, it does not deal with resource allocation, but rather migrating data to storage locations according to specific criteria.

It is understood that there are trivial solutions to the automated plan for changing a current VM placement, i.e., (re) placing VMs: for example, the operations involved in changing the placement may be executed in arbitrary order or, all together at the same time. These trivial solutions can easily result in illegal temporary states, however, such as overloading a host beyond its resource capacity, or placing multiple VMs on the same host despite a policy that forbids them from sharing a host.

Thus, while the concepts of automated planning, resource allocation, goal-driven planning (to reach from state A to state B) and ordering steps according to dependencies have been studied, there does not appear to be any prior art describing a solution for building a model for VM placement that facilitates the generation of an appropriate placement plan that avoids violating policies/constraints, and, additionally that accounts for migration cycles.

Moreover, neither the patent nor non-patent literature addresses observing migration cycles caused by policies, much less the concept of abusing a VM for breaking migration cycles. In the domain of virtual machines (e.g., Xen VMs, VMware VMs, etc), "abusing" a VM (i.e., make it release its assigned resources), is unlike abusing a process (that typically needs to be killed) or a transaction (that needs to be rolled back), in the sense that a VM can be simply suspended to an image form (that holds no runtime resources) or migrated/relocated to another host, without losing its state.

It would be highly desirable to provide a Virtual Machine Placement Planning (VMPP) system and method implementing a VMPP model for automatically generating a plan for changing a current placement of resource-consuming virtual entities, e.g., virtual machines in a computing environment, e.g., a datacenter or a cloud of distributed computing resources, into a given desired (target) placement.

It would be highly desirable that the system and method changes placement of virtual machines in computing environments from a first placement state into a given desired (target) placement state in a manner that is safe with respect to a set of VM-related constraints. That is, the plan should guarantee that no constraint is violated during its execution (i.e., after each step is executed).

It would be highly desirable to provide a virtual machine (VM) placement planning system and method implementing a VMPP model that assumes a server or like host device can execute more than one VM at the same time.

BRIEF SUMMARY OF THE INVENTION

The present invention is a VM placement planning (VMPP) system, methodology and computer program product for automatically generating a plan for changing the current placement of resource-consuming virtual entities, e.g., virtual machines (e.g., Xen® VMs) in a computing environment, e.g., a datacenter or a cloud of distributed computing resources, into a given desired (target) placement.

According to one aspect of the invention, the resulting automatically generated plan adheres to a set of constraints described in a model, in the sense that no temporal state of placement during plan execution (i.e., after the execution of each plan step) may violate a constraint.

According to a further aspect of the invention, the constraints include resource constraints and policy-based constraints (including a set of policies) that the automatically generated plan must not violate.

In one aspect, the invention includes constructing a graph-based model that represents the current placement state, the VM placement changes that are needed to achieve the desired state and the policy and resource constraints. Then, using a technique of graph pruning, a plan is deduced for achieving the desired placement. In one embodiment, a pruning algorithm is implemented that constructs the plan and ensures that each temporary state in the plan execution (i.e., after each step is executed) never violates the policies and resource constraints.

Further the VMPP system and method of the invention breaks migration cycles by employing a technique of "abusing" VMs, i.e., selecting a specific VM who participates in a migration cycle (as represented in the graph) and removing it from its current host to make it release its resources and allow other VMs to be migrated into that host, so that the cycle is broken. Furthermore, the "abuse" effect is only temporary. By maintaining the target placement of the abused VM unchanged, the abused VM is guaranteed to be eventually placed at its correct target host by the time the plan is done. That is, a later step in the plan will put the abused VM in its target placement.

In accordance with one aspect of the invention the following information is needed as input for the automated method of generating the plan:

a description of a computing environment consisting of a set of VMs and a set of hosts at which the VMs (possibly not all the VMs) are placed;

a current placement of VMs to hosts, describing how the VMs are currently placed at the hosts. The current placement is a function that assigns each VM to at most one host (i.e., to one host or to no host at all). Also, VMs that are assigned to hosts need to be allocated quantities of resources from their assigned hosts (e.g., CPU power and memory);

a target placement of VMs to hosts, describing how the VMs need to be placed at the hosts. The target placement is a function that assigns each VM to at most one host (i.e., to one host or to no host at all). Also, VMs that are assigned to hosts need to be allocated quantities of resources from their assigned hosts (e.g., CPU power and memory);

a set of policies associated with the VMs and hosts that must not be violated when the placement in the described environment is changed from the current placement to the target placement. In particular, both the current and the target placement should be valid with respect to the associated policies.

Given the above inputs, the method generates, at the computing device, a plan for changing the current placement of the VMs into the target placement of the VMs.

Further to this aspect of the invention, the computer-implemented method further comprises:

constructing a bipartite directed graph that represents both the current and target placement of VMs on hosts in accordance with the foregoing input information. This graph is a data structure that is then used by the method to generate the plan for changing the current placement of the VMs into the target placement of the VMs. Being bipartite, the graph's nodes consist of two distinct sets: a set of VM nodes and a set of HM (host) nodes. Also being bipartite and directed, each edge in the graph is either a (v, h) edge—representing a VM v whose target placement is HM h, or (h, v)—representing a VM v who is currently placed at HM h.

As part of the bipartite directed graph construction, VM v nodes whose placement is the same at both the current and the target placement functions are removed as are HM h nodes that have no pending VM v nodes (i.e., that are not target placement for any VM whose current and target placement are different).

Moreover, for each edge in the graph, the method iteratively generates VM placement changes that are needed to achieve a desired state without violating any policy or resource constraint. Using a technique of graph pruning, a plan is iteratively deduced for achieving a target placement of VMs in hosts. The actual pruning methodology includes functionality for iteratively constructing a sequence of instructions in an order that ensures that each temporary state never violates the policies and resource constraints.

In accordance with one aspect of the invention there is provided a system, method and computer program product for planning placement of virtual machines (VMs) in a computing environment comprising a set of host machines (HMs). The method is a computer-implemented method for planning placement of virtual machines VMs in a computing environment comprising a set of hosting machines HMs, the method comprising:

providing, at a computing device, a current placement function cp(v) representing a current placement of each virtual machine VM v in one hosting machines HM h;

defining, at the computer device, a modifiable copy of the current placement function, mcp( );

defining, at a computing device, a target placement function tp(v) representing a target placement of the virtual machines VMs in the HMs, one or more the VMs and HMs having a set of policies and resource constraints associated therewith; and, constructing, at the computer device, a graph comprising VM v nodes interconnecting HM h nodes via edges for modeling a current and target deployment states of the VMs;

iterating over HM and VM nodes of the graph and gradually modifying the mcp( ) placement function to resemble the target placement function; and generating, from the iterating, an ordered sequence of VM placement change instructions comprising a plan for changing the current placement of the virtual machines VM v into the target placement function tp(v) without violating the associated set of policies and resource constraints, after the completion of each instruction's execution; and, generating, for output at the computing device, the plan for changing the placement of the virtual machines VM v at the host machines HMs.

In accordance with a further aspect of the invention, there is provided a computer program product for planning placement of virtual machines VMs in a computing environment comprising a set of hosting machines HMs, the computer program product comprising:

a computer usable medium having computer usable program code embodied therewith, the computer usable program code comprising:

computer usable program code configured to provide, at a computing device, a current placement function cp(v) representing a current placement of each virtual machine VM v in one hosting machines HM h;

computer usable program code configured to define, at the computer device, sets of policies and resource constraints associated with the virtual machines VMs and host machines HMs; and, computer usable program code configured to define, at the computer device, a modifiable copy of the current placement function, mcp( );

computer usable program code configured to define, at a computing device, a target placement function tp(v) representing a target placement of the virtual machines VMs in the HMs; and, computer usable program code configured to construct, at the computer device, a graph comprising VM v nodes interconnecting NM h nodes via edges for modeling a current and target placement states of the VMs;

computer usable program code configured to iterate over HM and VM nodes of the graph and gradually modifying the mcp( ) placement function to resemble the target placement function; and computer usable program code configured to generate, from the iterating, an ordered sequence of VM placement change instructions comprising a plan for changing the current placement of the virtual machines VM v into the target placement function tp(v) without violating the associated set of policies and resource constraints, after the completion of each instruction's execution; and, computer usable program code configured to generate, for output at the computing device, the plan for changing the placement of the virtual machines VM v at the host machines HM.

Advantageously, the VMPP model can additionally be applied to a much broader range of policies that can be associated with VMs and HMs (Host Machines). This is because the methodology employed does not depend on the particular types of the policies, as long as they can be defined as predicates that can be evaluated over placements.

BRIEF DESCRIPTION OF THE DRAWINGS

Further features as well as the structure and operation of various embodiments are described in detail below with reference to the accompanying drawings. In the drawings, like reference numbers indicate identical or functionally similar elements.

FIG. 1 is a diagram illustrating a computing environment in which the present invention is deployed according to one embodiment of the present invention;

FIG. 3 is an example pseudocode depiction of the VM Placement Planning (VMPP) methodology 50 employed in the present invention;

FIGS. 4A-4C depict example pseudocode descriptions of methodologies (functions) 60, 65 and 67 respectively employed for evaluating a hypothetical placement that differs from the current placement in the placement of only one VM, and adding a host node to a set so that it will be scanned (processed) again in the next iteration of the main VMPP method;

FIGS. 5A-5C depict example pseudocode descriptions of methodologies (functions) 70, 75 and 77 for deducing a VMPP instruction in accordance with a VM v pruning applied to the VMPP model;

FIG. 6 depicts an example pseudocode description of the general abuse methods 80 that can use various strategies (e.g., as depicted in FIG. 7A and FIG. 7B) in order to break migration cycles;

FIGS. 7A and 7B show an example pseudocode description of two different strategies for abusing a VM with FIG. 7A depicting a method of "un-placing" a VM (e.g., suspending it or shutting it down) and with FIG. 7B depicting a method for relocating a VM to a host outside the cycle;

DETAILED DESCRIPTION OF THE PREFERRED EMBODIMENT

Figure 2:
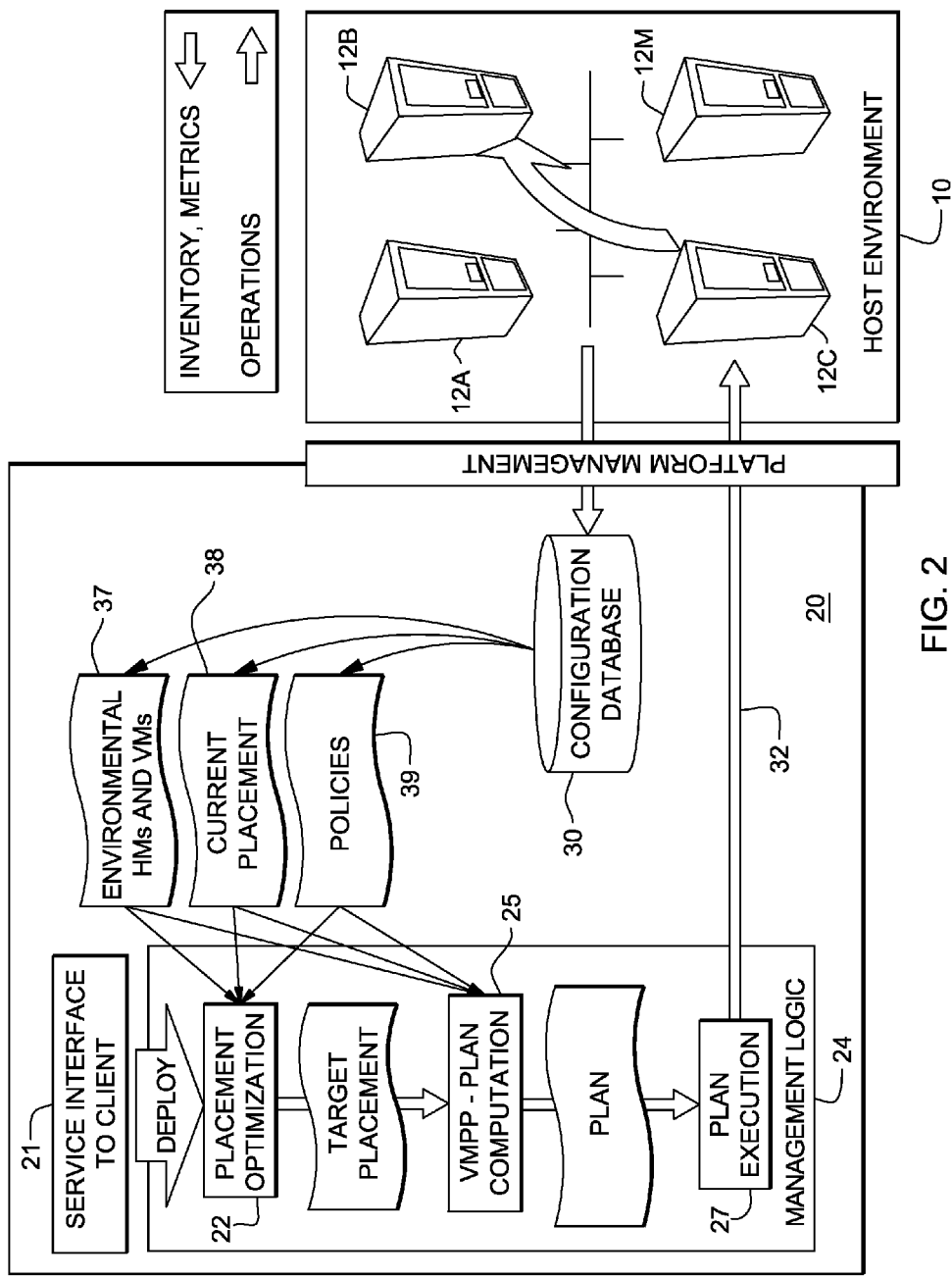
FIG. 2 is a diagram showing a more detailed view of the management server 20 of FIG. 1, in which the present invention is deployed according to one embodiment of the present invention.

In one aspect, the present invention implements a method that enables automated Virtual Machine Placement Planning (VMPP), i.e., computation of a plan for changing the placement of virtual machines (VMs) onto host machines (HMs) from a "current" placement to a desired "target" placement. By "placement" of a VM onto a HM, it is meant that the VM is hosted at the HM and is assigned portions of its resource. The method assumes (without implementing) preliminary steps of constructing both the current and the target placement of VMs onto HMs in the data center environment. The method requires that both the current and the target placement need to be valid with respect to a set of "restrictions" or "policies".

FIG. 1 depicts a diagram illustrating a computing environment 10 in which the present invention is deployed. Particularly, in FIG. 1, there is illustrated an example VM Hosting environment 10 (alternately referred to herein as a data center or "cloud") comprising host machines (HM) (e.g., servers or like physical machine computing devices) connected via a network 15 and a management server 20 in which the current invention is employed. As shown in FIG. 1, physical servers 12a, . . . , 12m, are each adapted to dynamically provide one or more virtual machines (VM1 through VMn denoted as 11a through 11n, respectively) using available virtualization technology, e.g., available from VMware or XenSource (both of Palo Alto, Calif.). Server virtualization is a technique that is well known in the art and is, therefore, not described in detail herein. As seen, multiple VMs can be placed into a single host machine and share its resources of CPU, memory etc, thereby increasing the utilization of an organization's data center. However, managing efficiently the placement of many virtual machines onto many host machines is a complicated task. Therefore, the current approach is to delegate this task to an automated management server that monitors the infrastructure and automatically manipulates the placement as needed by moving VMs between hosts (over the connecting network 15), suspending/resuming VMs, etc. This way, the entire infrastructure can be regarded as a single resource-rich entity into which VMs can be deployed and removed with ease. The management server itself can be running in a VM hosted on one of the HMs, or outside the HM. The server may be connected to a client console 40 providing a display as shown in FIG. 1, or to a global management system that manages larger-scale infrastructure.

FIG. 2 is a detailed illustration of management server 20 of FIG. 1 in which the present invention is deployed. The management functions 24 implemented in the management server 20 in such embodiment include (1) determining the "new", or "target" placement of VMs based on the environment, current placement and the policies from a database, e.g., a configuration database 30 holding the environment information (inventory of HMs and VMs) 37, their current placements 38, policies to be enforced 39 and metrics received as messages 34 from the HM server devices 12a-12m; (2) computing a plan to achieve the target placement from the current placement; and (3) executing the plan to actually achieve the target placement. A first function executed by logic implemented in management server 20 is represented as the Placement Optimizer 22, which implements optimization and constraint satisfaction (CSP) problems in a manner known to skilled artisans. A second function executed by logic implemented in management server 20 is represented as the VMPP computation 25 implemented according to the present invention. Based on the environment, current placement, policies and target placement (which was computed by the optimizer), it computes a plan to change the current placement into the target placement using actionable steps as described in greater detail herein. A third function executed by logic implemented in management server 20 is represented as Plan Execution logic 27 that generates the messages 32 to carry out the computed VMPP operations 32 and, interfaces with the network 15 and each of the server devices 12a-12m that include the hypervisor component in virtualization products such as Xen or VMware to carry out the plan operations via a suitable platform management interface 40.

The present invention is a method for constructing a graph-based model that represents the current deployment state, the Virtual Machine (VM) placement changes that are needed to achieve the desired state and the policy and resource constraints of the VM hosting environment (e.g., a server or like host computing devices, distributed or not). Then, using a technique of graph pruning (e.g., such as implemented in OS deadlock detection algorithms), a plan is deduced for achieving the target placement. The actual pruning algorithm employed constructs the plan as a specially-ordered sequence of steps that ensures that each temporary state never violates the policies and resource constraints. The application of the pruning algorithm to VM deployment automation necessarily requires defining the new model (graph).

In the description that follows, the following definitions apply:

VM—Virtual Machine;

HM—Host Machine (a physical machine that hosts VMs);

Resource—a quantifiable physical asset or capability that is provided by the HM and consumed/used by its hosted VMs for their operation. Examples of resources: memory, CPU power, network bandwidth, storage bandwidth, storage space, etc.;

Resource Vector (RV)—a vector of resource quantities. Each coordinate of the vector specifies a quantity of a specific type of resource. For example, a vector <5,3> may be defined to mean "5 units of CPU power and 3 units of memory". The actual units (e.g. MHz for CPU or MB (megabytes) for memory) may be disregarded as long as the same units are used for each resource throughout the method operation.

liveMigrate—a predicate function that defines for each VM "v" whether it should be live-migrated or not, when being moved from one HM to another. Non-live migration (e.g., hot or cold migration) involves an intermediary phase of un-placing the VM, as it is being suspended or shut-down. Therefore, liveMigrate(v)=true iff v should be live-migrated.

Capacity—a function cap: $H \rightarrow R^N$ where H is a set of HMs and $R^N$ is the Real vector space used for resource vectors. For each h∈H, cap(h) denotes the total resource capacity of that host, that is, the total amount of each resource that this host is capable of providing. For example, by agreeing to the same resource vector semantics as above, cap(h1)=<5,3> means that HM h1 has a total capacity of 5 units of CPU power and 3 units of memory, Placement Element (PEL)—an ordered pair of a host and a resource allocation. Formally, a PEL is an element of $(H \times R^N) \cup \{@\}$), where H is a set of HMs, $R^N$ is the Resource Vector space and where @ denotes a NULL, or "no-value".

Placement—a function place: $V \rightarrow ((H \times R^N) \cup \{@\})$ where V is a set of VMs, H is a set of HMs, and, $R^N$ is the Resource Vector space. Last, @ denotes a NULL, or "no-value". Generally, place(v) places a VM v by mapping it to a Placement Element consisting of either a HM h and a resource vector rv or a "no-value". If place(v)=<h,rv>, VM v is placed at the HM h that hosts it in the given placement and rv is the resource vector that denotes the resource allocation that v is granted at h. If place(v)=@ then v is not placed in any HM h.

Policy—a predicate function that takes a given placement function as a parameter and returns a value of either TRUE or FALSE. A return value of FALSE means that the policy is violated. For example, a binary "anti-collocation policy" means that two specific VMs must never be placed on the same HM. More formally, an anti-collocate<v1,v2>(place) is defined as a function that returns true iff the following holds: place(v1)==@ OR place(v2)==@ OR (place(v1)==<h1, rv1> AND place (v2)==<h2, rv2> AND h1≠h2).

Associated Policy—a policy is considered associated with all the VMs and HMs that define it. The anti-collocation policy in the previous paragraph is associated with the VMs v1 and v2. Formally, a function ap: $V \cup H \rightarrow P$, is defined where V, H and P are sets of VMs, HMs and Policies, respectively. ap(v)={policies in P that are associated with v}. A similar definition applies to ap(h).

Host Projection—the host part of a given VM placement. Formally, this is defined as a function hp: $(H \times R^N) \rightarrow H$ as follows: hp(<h, v>)=h.

Resource Projection—the resource vector part of a given VM placement. This is defined as a function rp: $(H \times R^N) \rightarrow R^N$ as follows: rp(<h,v>)=v. in(n)—when n is a node in a directed graph, in(n) denotes the number of incoming edges that end in this node.

out(n)—when n is a node in a directed graph, out denotes the number of outgoing edges that begin in this node.

An illustrative and non-limiting example for applying the VMPP methodology is now described in consideration of the following scenario: a VM v1 needs to be placed at host h5 where v8, v9 and v10 are currently placed (and whose eventual placement is elsewhere). Additionally, supposed that host h5 cannot accommodate v1 in addition to the already placed VMs at host h5. For example, suppose v1 requires 5 resource units, h5 provides 8 resource units, and v8, v9 and v10 require 3, 4 and 1 resource units respectively. Then, it is easy to see that v1 depends on particular subsets of {v8, v9, v10} to move away and free the resources. In this specific example, v1 depends on either {v8, v9} or {v9, v10} to move. In this case the dependencies between the VMs are formed as a result of the resource capacity constraints of the containing host. Consequently, moving VMs into and out of the host needs to be done in such an order that would guarantee that the host capacity does not become overloaded. In the above example, a valid plan would first move VMs {v8, v9} or {v9, v10} out of host h5 before moving v1 into h5. The present invention is about constructing a model of that allows the detection of the required placement changes and their ordering dependencies and then generating a valid plan that correctly orders the required changes.

The methodology entails first constructing a bipartite directed graph G(VV ∪ HV,E) with VV and HV being the sets of VMs and HMs that participate in the plan, respectively, and E being a set of directed edges representing the current and target placements of the participating VMs on the participating HMs. In the method of the invention, the following information and data are provided as system inputs:

Inputs:
1. V: (the set of VMs in the managed environment, e.g., data center or cloud);
2. liveMigrate function;
3. H: (the set of HMs in the managed environment, e.g., data center or cloud);
4. capacity function;
5. Current placement: cp(v)—a placement function that describes the current placement of VMs in the data center;
6. Target placement: tp(v)—a placement function that describes the target (desired) placement of VMs in the data center; and,
7. P: (a set of policies that must not be violated during the execution of the change plan)

It is understood that the methodology of the invention requires that both the current placement cp(v) and the target placement tp(v) are valid with respect to the set of input policies P. That is, for every policy p∈P, both p(cp)=true and p(tp)=true.

In the method of the invention, a system output comprises a sequential plan comprising a series of instructions that can be translated to real-world operations to be executed by the software that manages the virtualization capability of the hosts—for example, by the hypervisor component in virtualization products such as Xen or VMware. By executing its instructions in order, the plan changes the current placement of the data center into the target placement without violating any of the input policies. The resulting plan includes steps in accordance with the following types:
1. RELOCATE(v,h,rv)—migrate VM v to HM h with new allocation rv;
2. REALLOCATE(v,rv)—re-set the resource allocation of a VM V on its current HM to rv (without migrating to another HM);
3. UNPLACE(v)—make VM v un-placed, that is, not placed at any HM;
4. PLACE(v,h,rv)—place a previously un-placed VM v on HM h with resource allocation rv.

The types of steps that can be generated in a plan are defined according to all possible forms of placement change. These steps are abstract steps, derived from the model. However, each type of step can be realized in an actual virtualized environment (e.g., a data center) in a multitude of real-world hypervisor operations. For example, PLACE can be realized through creating a previously non-existent VM, or resuming a VM on a host. Similarly, UNPLACE can be realized e.g., through suspending a VM, completely shutting it down, or even destroying it. RELOCATE can be live migration, cold migration or hot migration (the method gives special consideration to live migration only to avoid un-necessary pauses of a VM's operation). Last, REALLOCATE is implemented by directly invoking the hypervisor's resource allocation control methods on the host where the VM is placed. The selection of each specific implementation of a step is done using the context of the implementation. For example, PLACE can be CREATE, START or RESUME depending on whether the VS existed before the step was executed. As a second example, RELOCATE can be interpreted as live, host or cold migration using labels assigned to each VM.

The planning methodology employed to change the current placement of the data center includes a preparation sequence that constructs a bipartite directed graph G(VV ∪ HV,E) and removes un-needed nodes and edges from the graph. This preparation sequence, which is executed only once as an initialization, includes the following steps:
1. Create an output plan—initially empty.
2. Create a node for every VM v in V and every 1M h in H. That is,
  2.1 let VV=V
  2.2 let HV=H
3. Remove from the graph VM nodes for VMs whose target placement is the same as their current placement. That is,
  for every VM v s.t. cp(v)=tp(v) (i.e., the placement of v does not change), do:
  3.1 let VV=VV\{v}//Remove v's node from the graph
4. Pre-emptively remove from the graph VM nodes for VMs who are destined to be un-placed, in order to free resources at the hosts. That is,
  for every VM v s.t. cp(v)≠(i.e., v is currently placed) AND (tp(v)==@ (i.e., v is destined to be suspended) do:
  4.1 let VV=VV\{v} //Remove v's node from the graph
  4.2 Append a "SUSPEND(v)" instruction to the plan
5. Adding edges to the graph for the current placement. That is,
  for every VM v s.t. cp(v)=<h, rv> (≠@) do:
  5.1 let E=E ∪ {(h,v)} //Add edge (h,v) to E
6. Adding edges to the graph for the target placement. That is
  for every VM v s.t. tp(v)==<h, rv> (≠@) do:
  6.1 let E=E ∪ {(v,h)} //Add edge (v,h) to E
7. Remove un-needed HM nodes. That is,
  for every HM node h s.t. in(h)=0 do:
  7.1 let HV=HV\{h} //Remove h's node from the graph
8. Create a modifiable copy of cp( ) to use in the algorithm. That is, let mcp( )=cp( )

It is understood that the HMs that were removed as unneeded from the graph in step 7 of the preparation sequence will not participate in the algorithm detailed below. However, these HMs can be used as temporary hosting locations for VMs in an alternate abuse operation that does not require suspending VMs. Details of the alternate abuse method are provided herein below with respect to the description of FIG. 7B. Furthermore, note that the placement function cp( ) itself will not be used by the algorithm—instead, the algorithm will operate on a modifiable copy of cp( ) referred to herein as mcp( ), as is declared in step 8 of the preparation sequence. The algorithm employed in the method of the invention generates a plan for achieving the target placement starting at the current placement by gradually "changing" the current placement while processing the graph. In one embodiment however, the current placement of VMs on HMs is not changed (e.g., by actually relocating or placing VMs) when the plan is computed—this happens only when the plan is actually executed. This may happen at a later time after the computation is done, and possibly executed by a different software component). To avoid this confusion, the algorithm explicitly avoids changing the original cp( ) by modifying mcp( ) instead.

From these initializations, a bipartite directed graph G(VV ∪ HV, E) is automatically generated. This graph is then processed by the algorithm in FIGS. 3-7A/B in order to generate the required plan. For purposes of illustration, this graph's nodes may consist of two kinds of nodes: round nodes for VMs and square nodes for HMs. Each round node must have exactly one outgoing edge to a square node and at most one incoming edge from a square node. Each square node may have zero or more outgoing edges to round nodes and one or more incoming edges from round nodes. As can be seen from the preparation sequence described in detail above, not all VMs and HMs get to participate in the graph and in the following processing. VMs whose placement doesn't change (current and target placement are the same) are filtered out. Similarly, HMs that have no pending VMs (i.e., participating VMs who need to be placed at them) are also filtered out.

Figure 8:
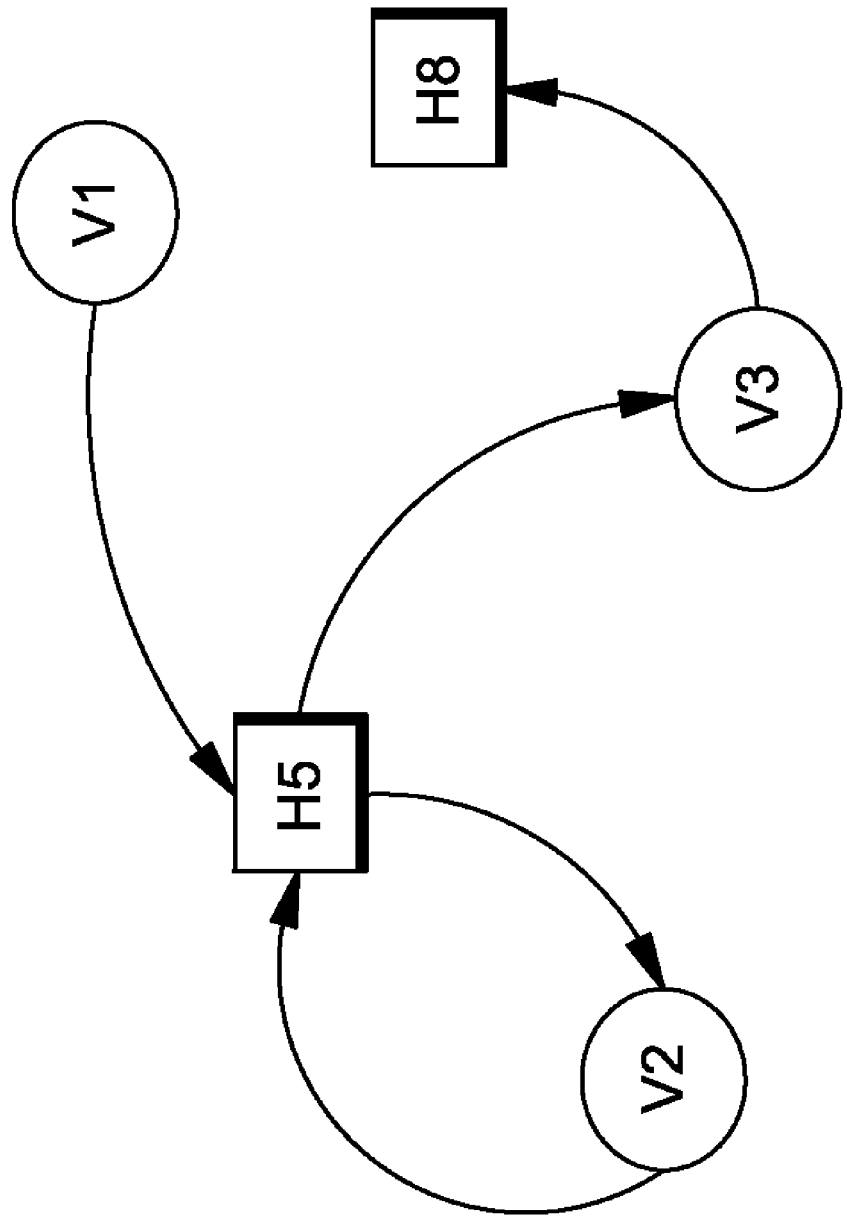
FIG. 8 shows a sample of a directed bi-partite graph G(VV ∪ HV, E) that can be created for a particular input by a preparation sequence executed prior to the VMPP method of the present invention.

FIG. 8 shows a simple example for a graph 45 that could be constructed by the preparation sequence above. There are 3 VMs whose placements change between the current and the target placement, and therefore will participate in the graph: V1, V2 and V3. Also, there are 2 HMs who participate in the graph because they are VMs that need to be placed on them: H5 and H8. V1 is currently un-placed (i.e., cp(V1)==@) and needs to be placed at HM H5 (i.e., hp(tp(V1))==H5). V2 is currently placed at H5 but needs to have its resource allocation adjusted (so its placement still changes). V3 needs to move from its current HM H5 to HM H8.

FIGS. 3,4,5,6,7A and 7B illustrate example pseudocode descriptions of the algorithm that is employed by the present invention. The notation used in the pseudocode descriptions of the algorithm follows certain guidelines:

a. The algorithm is divided into a main portion (FIG. 3) and specific functions used by the main portion and by other functions (FIGS. 4-7A/B). Other than the main portion depicted in FIG. 3, each function starts with an underlined title/header that specifies the name of the function and possible parameters.
 b. Each step in either the main portion or the functions is assigned a number (standard nested numbering used in documents) that both orders the steps (relative to the start of the function or main portion that includes it) and dictates their nesting, in the sense that if step A is nested inside step B then the execution of step B includes executing step A (unless flow control dictates otherwise). As a consequence, describing each high-level step (such as a while loop) requires only specifying the number of its first step (i.e., the actual step with the "while"), since the rest of the steps inside the loop are nested after the first step.
 c. All the variables declared in the main portion are considered global, in the sense that each of them can also be referred to in the functions that follow the main portion.

Before describing the details of the algorithm that underlies the VMPP methodology 50 in FIG. 3, a brief description of the flow is provided for convenience and clarity. The algorithm consists of two primary loops: an outer loop 51 (while loop in FIG. 3 begins at step 3) and the inner loop 52 (while loop in FIG. 3 begins at step 3.3). Each iteration of the inner loop 52 executes in two main phases 53, 54. At the first phase 53 (for loop in step 3.3.2, FIG. 3) the method tries to place pending VMs on their target HMs (step 3.3.2.1.1 in FIG. 3) and consequently prune them from the graph and add the respective placement instructions for the VMs in the plan (step 3.3.2.1.1.1 in FIG. 3). At the second phase 54 (steps 3.3.3-3.3.6, FIG. 3), the method tries to prune HM nodes that have no remaining pending VMs. In addition, the algorithm maintains "D"—the set of HMs that need to be processed in the current iteration and "ND"—the set of HMs that need to be processed in the next iteration. During the first phase 53 of the each iteration of the inner loop, every HM in D is processed by trying to place its pending VMs on it. A HM h will be added to ND (inside prune_vm called in step 3.3.2.1.1.1, FIG. 3) only if the placement of VMs on h has changed, i.e., some VMs were placed in h or moved away from h, since this might allow some of h's pending VMs to be placed in the next iteration. ND is also checked at the end of each iteration, after both phases have completed (step 3.3.7, FIG. 3)—if ND is determined empty in step 3.3.7 (i.e., no HMs to process in the next iteration) but the graph is still not empty in step 3.3.7.1 (VV is not empty—some VMs still haven't reached their target placement), then no new pending VMs have been placed on HMs in the current iteration of the inner loop. In that case, the next step includes performing a check for two possible causes: One cause is the implementation of "special policies" that enforce placement order between VMs on different hosts and consequently prevented their associated VMs from being placed when their target hosts were processed. To handle this possibility, the algorithm includes the outer loop 51, FIG. 3. If the inner loop inside the current iteration of the outer loop yielded some placement changes (placement success in step 3.3.2.1.1 of FIG. 3) but could not place all the VMs, the rescan variable that controls the outer loop is set to TRUE in step 3.3.2.1.1.2, the check for rescan in step 3.3.7.1.1 will fail and, as a result, the next iteration of the outer loop will scan all the hosts in HV again, to check whether the "special policies" will now allow placing more VMs. If no progress was made in the inner loop (rescan is FALSE in step 3.3.7.1.1), the algorithm checks for the second cause—that there are migration cycles in the graph, where multiple pending VMs prevent each other from reaching the target placement in a deadlock situation. Consequently abuse operations are attempted (step 3.3.7.1.1.1) in order to force some of the deadlocked VMs to move away from the cycle (e.g., by suspending or moving to alternate HMs) and thus break the cycle. The abused VMs are guaranteed to eventually reach their target placement just as all other VMs since the algorithm keeps them on the graph and maintains their target placement. The algorithm terminates when either all VMs are placed and the graph is empty (step 3.3.7.2) in which case the computed plan is returned (step 4), or when no placement progress can be made by rescanning hosts or abusing VMs (step 3.3.7.1.1.1.1) in which case the NO_PLAN value is returned.

Following next is a detailed step-by-step description of the main portion of the algorithm. The algorithm begins in step 1 by initializing A, the set of abused VMs, to an empty set as will be discussed in greater detail herein below with respect to FIGS. 7A-7B. Next (step 2), the algorithm initializes rescan to TRUE, to allow entering the outer loop 51, which starts at the next step 3. At step 3.1, rescan is set again to FALSE, since, as explained supra, another iteration of the loop will occur only if the inner optimized loop manages to move some VMs to their target placement, but not all of them. Also, as explained supra, each iteration of the outer loop runs the optimized inner loop over all the remaining hosts in the graph (i.e., all of HV). Thus, the next step (3.2) inside the outer loop, initializes set "D", which is the set of hosts that should be processed in the current (first) iteration of the inner loop, and is initially set to HV. The inner while loop then starts at step 3.3 to run until D becomes empty, which means the loop can no more change the placement at HMs to allow placement of further VMs. Each iteration of the inner loop begins with resetting ND, the set of HMs to be processed in the next iteration, to an empty set (step 3.3.1). Step 3.3.2 marks the entry into the first phase of an iteration of trying to place pending VMs (as explained supra)—the "for" loop 53 processes each HM h in D in the current iteration. Inside loop 53, the first step 3.3.2.1 starts another "for" loop to go over all the pending VMs of the current HM h (which are found using the incoming edges of h's node in the graph). Each pending VM is then attempted to be moved to its target placement by invoking the function try_place( ) at step 3.3.2.1.1. If the VM can be moved (the function try_place( ) returns TRUE), then the pending VM is pruned from the graph by calling the function prune_vm( ) in step 3.3.2.1.1.1, which also prunes the edges connecting the pruned VM, adds the appropriate placement instruction for placing the VM to the plan and possibly adds the VM's current and target HMs to ND (as their placement may have changed). Also, if a VM is successfully moved, rescan is also set to TRUE in step 3.3.2.1.1.2 to mark a progress having been made—so that if a deadlock situation is encountered, the algorithm will first attempt another iteration of the outer loop before resorting to abuse operations. Next, step 3.3.3 is the first step of the second phase noted supra—it computes the set C of HMs with no more pending VMs. Steps 3.3.4 and 3.3.5 prune C's nodes from ND and HV, respectively. Step 3.3.6, which concludes the second phase, is a double-nested "for" loop that removes all the outgoing edges of the pruned HMs from the graph. Following step 3.3.7 is the test that concludes the inner loop. First, it checks if the inner loop is going to end (ND=={ }), in which case it checks in step 3.3.7.1 whether some pending VMs have still not reached their target placement (VV≠{ }). If all VMs are at their target placement ("else" in step 3.3.7.2), then rescan is set to FALSE (step 3.3.7.2.1) to force exiting the outer loop 51 (in addition to the end of the inner loop 52) and returning the plan at step 4, FIG. 3. If some VMs are still pending (step 3.3.7.1.1), it checks whether rescan is TRUE in step 3.3.7.1.1, meaning some progress was made in the current run of the inner loop. If such progress is made, the inner loop will simply terminate after step 3.3.8 but rescan will force another iteration of the outer loop. If no progress was made, the algorithm assumes that this was because of migration cycles (see below), and will therefore try to abuse VMs to break the cycles (step 3.3.7.1.1.1). If abuse also fails, the algorithm gives up and returns NO_PLAN. The last step after the test is 3.3.8 in which D is assigned the value of ND in preparation for the next iteration of the inner loop 52.

As can be seen in FIG. 3, there are situations in which the algorithm employed in the present invention might fail to compute a plan (i.e., return NO_PLAN). There are 2 reasons for those:

a. When a sequential plan cannot be generated. For example, there could be policies that require "simultaneous" manipulation of placement of two or more VMs. For example, a collocation policy might require that two or more VMs be placed together on the same host or not at all. Obviously, when using such policies, there may be conditions where a sequential plan that operates on one VM at a time cannot avoid violating such a policy, at least temporarily.

b. When there is no possibility to break migration cycles by "abusing" VMs. This could happen, for example, when all the VMs that are part of the cycle cannot be suspended due to forbidding policies (when employing abuse by suspending VMs), or when there is not enough resource reserve in a host outside the cycle to allow one of the VMs in the cycle to migrate away from it (when employing abuse by migrating VMs).

FIGS. 4A-4C depict respective functions that are used by the method—either in the main portion (FIG. 3) or in other functions (FIGS. 5,6,7A/B). The first function shown in FIG. 4A is try_place( ) function 60 which receives two parameters—a VM v and a placement pair newPlv. The try_place( ) function 60 hypothetically modifies the current placement mcp( ) by altering its returned value for VM v to be newPlv and checks whether this would result in a valid placement with respect to the policies that could be affected (i.e., policies associated with VM v and the policy subsets of its current host before and after the change) and with respect to the resource capacity of VM v's new current host not being exceeded. The function starts in step 1 (FIG. 4A) by constructing the hypothetical current placement cp'( ) that returns the same values for all VMs v'≠v but returns cp'(v)=newPlv. Next, the set PS of policies that need to be evaluated for the placement change is computed. PS needs to contain all the policies whose evaluation might change as a result of the placement change of VM v. First (step 2, FIG. 4A), it contains the policies associated with v, i.e., ap(v). Then, if mcp(v)≠@, then the policies in ap(mcp(v)) needs to be added as well (step 3, FIG. 4A). Last, if newPlv≠@, then ap(hp(newPlv)) is also later checked in step 6, FIG. 4A. Next in step 4, FIG. 4A, actual evaluating of cp'( ) begins. If newPlv==@ then v is not going to be placed on a host, which means that only policies (i.e., PS) need to be checked, as is done by calling check_policies( ) 65 in step 4.1, FIG. 4A. The result of check_policies( ) 65 (either TRUE or FALSE) in step 4.1, FIG. 4A, is also returned as the result of try_place( ). If step 5, FIG. 4A, is reached then newPlv≠@, so v is going to be placed on the host hp1=hp(newPlv). Consequently, in step 6, FIG. 4A, only if both the policies in PS ∪ ap(hp1) are not violated (by calling check_policies( ) 65, FIG. 4B) and the resource capacity of hp1 is not overloaded (i.e., $\Sigma\{rp(cp'(w))|VM\ w \in V\ s.t.\ hp(cp'(w))==hp1\}<cap(hp1)$), then cp'( ) is ok and TRUE is returned (step 6.1). Otherwise (step 7), FALSE is returned.

The second function shown in FIG. 4B is check_policies( ) 65, which simply evaluates a given set of policies PS over a given placement pf and returns TRUE only if all policies in PS evaluate to TRUE over pf, or FALSE otherwise. Step 1, FIG. 4B, is a "for" loop that iterates over all the policies in PS. Step 1.1 evaluates each policy p over the placement pf. If p evaluates to FALSE, then FALSE is returned (step 1.1.1). If the loop ends, then all policies evaluated to TRUE and so the function returns TRUE in step 2.

The third function depicted in FIG. 4C is rescan_host( ) 67 which takes a single parameter—a placement element pel. rescan_host( ) adds the host of the placement element pel to ND to be processed again in the next iteration of the inner loop 52 in FIG. 3, but only if pel is not @ (NULL) and includes a host that is still in the graph (i.e., in HV). In step 1, the rescanhost( ) function 67, FIG. 4C, first checks that pel≠@, i.e., that there is a host that can be added to ND. If so, it isolates the host part hpel=hp(pel) in step 1.1, FIG. 4C. In step 1.2, FIG. 4C, hpel is checked to be in HV (i.e., still in the graph). Only if so, hpel is added to ND in step 1.2.1, FIG. 4C. Step 2 ends the function and returns to the caller.

FIGS. 5A-5C depict example pseudocode descriptions of methodologies (functions) for deducing a VMPP plan in accordance with a VM v pruning applied to the VMPP model. FIG. 5A presents a pseudocode description of an implementation for pruning of VMs in the graph. The main function that handles pruning is called prune_vm( ) 70, and it further invokes two pruning-specific functions of prune_outgoing_edge( ) 75, depicted in FIG. 5B, and prune_incoming_edge( ) 77, depicted in FIG. 5C. The function prune_vm( ) 70 takes a single parameter which is the VM v to prune. It starts in steps 1-3, FIG. 5A by generating the appropriate step for moving the placement of v from the current placement to the target placement. Step 1 of function prune_vm( ) 70 checks whether v is placed after not being previously placed, i.e., mcp(v)==@ (NULL) and tp(v)≠@, in which case it generates a PLACE instruction to be added to the plan for v (step 1.1) and prunes v's outgoing edge by calling prune_outgoing_edge( ) 75 in step 1.2. If the check in step 1 fails, step 2 checks whether v is reallocated a new vector of resources, i.e., hp(mcp(v))=hp(tp(v)), in which case it generates an appropriate REALLOCATE instruction for v and adds it to the plan in step 2.1, as well as pruning v's incoming and outgoing edges by calling prune_incoming_edge( ) 77 in step 2.2 and prune_outgoing_edge( ) 75 in step 2.3, respectively. Last, if v is neither placed nor reallocated, then it is necessarily relocated between different hosts (un-place is not an option since all VMs that need to be unplaced have already been pruned from the graph—with the appropriate instructions added to the plan—in the preparation sequence.) Thus, the "else" condition is satisfied and the pseudocode depicted at step 3, FIG. 5A would execute and consequently, the RELOCATE instruction would be added to the plan for v (step 3.1) and its edges would be pruned in steps 3.2 and 3.3 by invoking prune_incoming_edge( ) 77 (FIG. 5B) and prune_outgoing_edge( ) 75 (FIG. 5C), respectively. Next, in step 4, FIG. 5A, the v's own node is pruned from the graph (removed from VV). Steps 5 and 6, FIG. 5A, respectively add the current and target hosts of v to ND (if applicable) by implementing the rescan_host( ) function 67 of FIG. 4C. Step 7, FIG. 5A, finally adjusts mcp(v) to be the same as tp(v) and step 8, FIG. 5A, concludes the function 70 by returning to the caller.

The function—prune_outgoing_edge( ) 75 in FIG. 5B, takes a VM v and a HM h parameters and removes the edge (v,h) from the set E of the edges of the graph (step 1) and then returns in step 2. The prune_incoming_edge( ) function 77 in FIG. 5C functions similarly but removes the edge (h,v) from E.

Figure 9B:
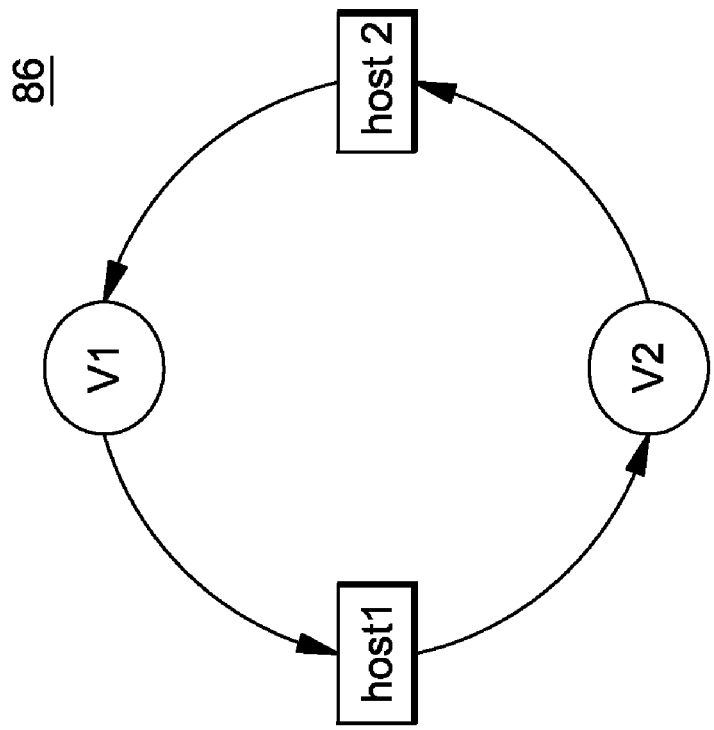
FIG. 9 shows a migration cycle (labeled "A") and the graph (labeled "B") that is constructed for it by a preparation sequence executed before the VMPP method in the present invention.
Figure 9A:
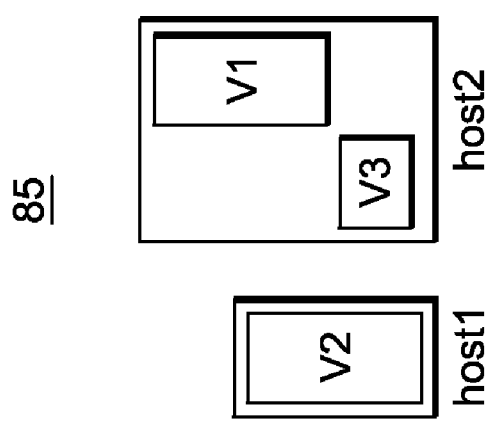

Before describing the details of abuse operations depicted in FIG. 6, reference is now had to FIGS. 9A-9B describing migration cycles. FIG. 9A depicts an example flow description of a migration cycle 85 and FIG. 9B depicts an example graph 86 constructed according to the example migration cycle of FIG. 9A. In a migration cycle 85, multiple VMs prevent each other from reaching their target placement, so that all VMs become deadlocked—no ordering of placement instructions can put all the VMs of the cycle in their target placements without violating a policy or exceeding a host capacity, at least temporarily. Generally, a migration cycle can be described as if all the deadlocked VMs can be ordered in such a way that each two consequent VMs in the order, as well as the first and the last VMs, share a common host, which is the target host of the former and the current host of the latter, and some policy or capacity constraint prevents the former from reaching its target placement before the latter—such is the cyclic nature of the problem. The example scenario 85 in FIG. 9A shows 2 hosts, host1 and host2. On host1 there is VM V2, and on host2 there are VMs V1 and V3. In the target placement (as shown by the black arrows in FIG. 9A) V2 needs to be relocated (migrated) to host2 and V1 needs to be relocated to host1. Now, for illustrative purposes, the height and width of each box (VM/HM) in FIG. 9A describe its CPU and memory capacity/allocation, respectively. Thus, neither VM can be relocated first to its target host without overloading the host. As can be seen in FIG. 9B, the migration cycle also appears as a cycle in the graph 86 that is constructed by the preparation sequence, before the main algorithm 50 starts to run. However, it should be noted that the opposite is not necessarily true—a cycle in the graph does not always indicate a migration cycle. If, for example, either of host1 or host2 had a large free resource reserve for CPU/memory, then the graph would have still shown a cycle, but no migration cycle would have actually occurred—a simple solution of moving first the VM destined at the host with the reserve resource space would have solved the problem.

The method of the present invention thus includes a specific technique of handling migration cycles by "abusing" VMs. The general concept is to break the cyclic dependency of the deadlocked VMs by picking a VM from the cycle and changing its current placement to a location that is outside the cycle (e.g., on an outside host or even not on a host at all), and adding the respective instruction (RELOCATE, UNPLACE, etc) to the plan. This helps in breaking the dependency between the abused VM and the VM that precedes it in the cycle order. Once the dependency is broken, the remaining dependencies can be resolved through a proper ordering of placement instructions for the rest of the VMs in the cycle. It could be, though, that abusing one VM may not be enough due to more complex dependency routes that involve more than one cycle. For this reason, the algorithm keeps abusing more VMs as long as it cannot make progress in moving VMs to their target placement (see, e.g., FIG. 3, step 3.3.7.1.1.1).

Furthermore, in the abuse implementation (FIGS. 6, 7A/B), the target placement of the abused VM may never be modified, and its target host and current host are added to ND (the set of hosts to be processed in the next iteration of the inner loop) immediately after the abuse, so as to guarantee that a later iteration of the inner loop will be able to prune the abused VM after it reaches at its target placement (host and allocation). In other words, if the algorithm manages to generate a plan, it is guaranteed that after the instruction that abuses the VM, there will be a later instruction that eventually puts the abused VM in its target placement. In the example migration cycle 85 depicted in FIG. 9, if V1 is abused by being temporarily un-placed from host2, V2 can then be relocated to its target placement, since the dependency cycle is broken. However, after that, the algorithm will detect that V1 can now also reach its target placement and generate the appropriate instruction. Thus, a possible plan that can be generated by the algorithm would be as following:

a. UNPLACE V1
b. RELOCATE V2, host2, <rp(tp(V2)) as an actual resource vector value>
c. PLACE V1, host1, <rp(tp(V1)) as an actual resource vector value>

Note that instruction a. in the above possible plan that can be generated by the algorithm was generated by the abuse operation, which broke the cycle and allowed V2 to move to its target location (instruction b. in the above possible plan that can be generated by the algorithm). Finally, by maintaining the target placement of V1 and rescanning its target host, V1 will be deployed to its target placement as well in instruction c. in the above possible plan that can be generated by the algorithm. In this solution, in an instance that V1 may be a VM that requires only live migration, two (2) methods to resolve this may include: 1) implementing an abuse technique that un-places VMs but tries to pick abuse candidates that do not require live migration, or 2) using an abuse technique that does not involve un-placing VMs at all—e.g., abuse by relocating VMs to other hosts, if such hosts are available. Both ways are allowed in the present invention and are discussed further detail herein below.

Following is a detailed step-by-step description of the pseudocode of the top-level abuse( ) function 80 that appears in FIG. 6. First, it should be noted that this function uses two other functions—select_abuse( ) (91 in FIG. 7A or 95 in FIG.

7B) and try_abuse( ) (92 in FIG. 7A or 96 in FIG. 7B). select_abuse( ) chooses the next candidate VM for abuse out of a given set and try_abuse( ) tries to abuse a given VM. More details on both functions are provided in the next paragraph. The abuse( ) function 80 in FIG. 6 takes a single parameter—a set of VMs SV from which it will try to select and abuse a single VM. Step 1 of the function initializes the set AC of remaining VM candidates to scan to SV\A, that is, all the VMs that have been previously abused are excluded. Next, step 2 starts the "while" loop of scanning all the VMs in AC for candidates, i.e., until AC is empty. First step 2.1 in the loop calls select_abuse( ) to locate the next VM candidate to abuse. Next, step 2.2 checks if select_abuse( ) managed to locate such a candidate by not returning @ (NULL). If the returned value is @, then step 2.2.1 returns FALSE to the caller to signal that abuse( ) has failed completely (which will ultimately abort the main algorithm in FIG. 3 and return a NO_PLAN). If a candidate VM was returned, it is removed from AC so that it will not be checked again in this invocation of abuse( ). Next, step 2.3 actually tries to abuse the found candidate by calling try_abuse( ), which returns either TRUE on success in abuse, or FALSE on failure. if FALSE is returned, then the loop will continue with other candidates (or until it fails) back in step 2. If it succeeds, the abused VM v is added to A in step 2.3.1 so that it will never be abused again, and its target and (temporary) current host are added to ND in steps 2.3.2 and 2.3.3 since their placement has changed, and finally, the function returns TRUE to signal to the caller (the main algorithm in FIG. 3) of success and a consequent another iteration of the inner loop 52 to try to place more VMs. If AC has been completely exhausted without successfully abusing a VM, the loop of step 2 will end, and step 3 will return FALSE to signal abuse failure to the main algorithm, similar to step 2.2.1.

As noted supra, the abuse( ) function 80 in FIG. 6 relies on two additional functions, select_abuse( ) 82, which picks up the next candidate for abuse, and try_abuse( ) 84, which attempts to perform abuse on the candidate. These two functions form together an abuse strategy, in the sense that both their implementations are derived from picking a specific strategy for abusing VMs, such as abusing a VM by un-placing it, or by relocating it to a host outside the cycles. Regardless of the strategy, the abuse( ) function imposes that no VM is allowed to be abused more than once, since the algorithm assumes that no abuse strategy will place the abused VM on a host that has pending VMs, which might result in additional migration cycles. Additionally, no strategy is allowed for modifying the target placement of the abused VM, since maintaining it guarantees the eventual placement of the abused VM at its target placement.

FIG. 7A depicts an example of an abuse strategy of a first embodiment that works by un-placing a VM, that is, making it release its allocated resources at its current host without being relocated to another host. The example implementation of select_abuse( ) 91 function in FIG. 7A implements this strategy. The function takes a single parameter SV which is the set of candidate VMs to choose from. In step 1 of the select_abuse( ) 91 function in FIG. 7A, the function tries to first select a candidate VM v that holds resources on a host (i.e., mcp(v)≠@) and that can tolerate suspension of its operation (i.e., liveMigrate(v)=FALSE). If it finds such a VM of the select_abuse( ) 91 function in FIG. 7A, (step 2), that VM is returned (step 2.1 of the select_abuse( ) 91 function in FIG. 7A). Otherwise, it tries in step 3 of the select_abuse( ) 91 function in FIG. 7A to find any VM that holds resources. If such a VM is found (step 4 of the select_abuse 91 function in FIG. 7A), it is returned (step 4.1). Otherwise, no matching VMs can be found and the function fails by returning @ (NULL). Similarly, the example implementation of try_abuse( ) 92 in FIG. 7A is also consistent with this strategy. This function takes a single parameter VM v—the VM to try to abuse. Given that the abuse is by un-placing, the function first checks in step 1 that the VM can be un-placed by calling try_place(v, @) (see try_place( ) 60, FIG. 4). If try_place( ) returns FALSE (step 2), then, of course, the abuse cannot be performed, so FALSE is returned in step 2.1. If TRUE is returned, then the abuse is realized by first appending the appropriate UNPLACE to the plan (step 3), then setting the current placement of v to @ in step 4, and finally returning TRUE to signal success in step 5.

FIG. 7B presents yet another example of an abuse strategy of a second embodiment—by relocating VMs to HMs hosts) outside the cycle, so that the abused VM's operation does not have to be temporarily suspended. The hosts are picked out of a predefined set PH. The set PH could be a predefined dedicated pool of backup servers that are reserved for such use, or it could be a set that was dynamically constructed during the operation of the algorithm, e.g., by adding every HM h with in(h)=0 to PH (step 7 of the preparation sequence described supra, and step 3.3.3 of the main portion of algorithm 50 in FIG. 3). In any case, PH should not contain hosts that part of the graph at the time the abuse operation is invoked, so that using its hosts for abused VMs may not generate additional migration cycles. Note that this abuse strategy will try to place each candidate VM at a HM out of PH, so it is more costly in terms of time complexity compared to the un-place strategy. However, if migration cycles are expected to be rare, this strategy could be cost-effective, especially due to its advantage of avoiding suspension of VM operation.

Following next is a detailed step-by-step description of the implementation of the abuse by relocation strategy in FIG. 7B. First, select_abuse( ) 95 (in FIG. 7B) is a function that takes a single parameter SV which is the set of candidate VMs to choose from. Given that this strategy offers relocation over suspension, it can abuse any VM that holds resources, which is what select_abuse( ) 95 does in step 1, in FIG. 7B. If such a VM is found (step 2), it is returned (step 2.1). Otherwise, @(NULL) is returned in step 3. An example implementation of try_abuse( ) 96 (FIG. 7B) in accordance with this strategy is presented as follows. Similar to the previous strategy depicted herein with respect to FIG. 7A, this function takes a single parameter VM v—the VM to try to abuse. Then, it iterates over all the hosts in PH (step 1, try_abuse( ) method 96, FIG. 7B) and tries to place v in each host (by calling try_place( )—see 60, FIG. 4A), once with its current resource allocation (step 1.1, FIG. 7B) and once with its target resource allocation (step 1.2, FIG. 7B). If either of this placements succeeds, it is realized by appending the appropriate RELOCATE instruction to the plan (steps 1.1.1 and 1.2.1, respectively), updating mcp(v) to match the temporary placement (steps 1.1.2 and 1.2.2, respectively), and returning TRUE (steps 1.1.3 and 1.2.3, respectively). Last, if v cannot be placed in any host from PH, FALSE is returned in step 2, FIG. 7B.

The algorithm implementation described herein is capable of handling essentially any policy that can be defined as a predicate that is evaluated over placement. However, it does employ one optimization of "follow the change" to improve its time complexity. This optimization, which is implemented in the inner loop 52 (FIG. 3), assumes that the ordering of a VM's placement operation in the plan depends mostly on the placement at the target host of that VM, so placing that VM should be considered at the first iteration and then, only when the placement at the target host changes. Consequently, the algorithm operates in iterations, where in each iteration it tries to place only a VM whose target host's placement has changed in the previous iteration (and, in the first iteration, the algorithm covers all the hosts). The assumption that underlies this optimization holds for all of the commonly-used policies, such as anti-collocation, location restrictions, resource margins, etc., as well as for the resource capacity constraint itself (changes in the placement at the target host are needed to free resources). However, this optimization does not apply to certain kinds of "special" policies that enforce order of placement change between VMs with disjoint sets of current and target hosts For example, suppose VM v1 can be placed at host h5 only after VM v2 is placed at host h3 due to some dependency policy. When such policies are used, it may be possible for a host not to be processed anymore after a certain point while it still has pending VMs. To overcome that, whenever the algorithm reaches a computation deadlock (step 3.3.7.1 in the main algorithm 50, FIG. 3), it may try another pass over all the hosts with pending VMs ("rescan") in the outer loop before resorting to abusing VMs.

Note, however, that the "special" policies that violate the optimization's assumption may not be needed for the plan computation. Referring back to the example above, the order enforced between VMs v1 and v2 may be the result of a dependency between the applications contained in the VMs. In that case, the dependency can be delegated to a later time of actually starting the VMs. The motivation for not using such policies is that without such policies more optimizations can be employed to make the algorithm both run its main path and handle deadlocks more efficiently. In the main path, the loop of try_place( ) in step 3.3.2.1 in the main portion 50 in FIG. 3 can be skipped if the host's out degree is 0, which means that no VMs are going to leave the host as part of the placement change, only deployed to it. So, in that case, all the pending VMs of that host can be simply moved into their target placement without checking policy violations. As for handling deadlocks, there is no need for the "rescan" outer loop since a deadlock can only mean a migration cycle.

Furthermore, the algorithm could be modified to handle such "special" policies more efficiently, in a way that would make the outer loop redundant. For example, the dependency policy mentioned above could be converted into additional edges in the resulting graph in order to allow the "follow the change" optimization to use it. For example, if v1 depends on v2, an edge can be added from v1 to v2, or (if we wish the graph to remain bi-partite and avoid a major change in the main part of the algorithm), an edge from v1's target host to v2. With this added information, the optimization would try to move v1 to its final placement as soon as v2 is placed, without falling back to the un-optimized outer loop, as is done in the main algorithm. This optimization allows therefore removal of the outer loop 51 in FIG. 3 and the "rescan" variable that controls it. However, the effectiveness of this optimization depends on it being intelligently applied to as few special policies as possible and as efficiently as possible. For example, if only v1 depends on v2 being placed before it but not the other way, then an edge should be added only from v1's node (or from v1's target host's node) to v2, and not the other way. Note, however, that such an optimization would require special support for particular types of policies—dependency policies in this case, and is therefore not considered part of the basic algorithm, which is generic and does not depend on specific types of policies.

In addition to the optimizations explained above, an observant reader may note that the algorithm can be further optimized in various low-level coding aspects, such as not repeating scanning the same VMs when a candidate fails to be abused in the abuse( ) 80 implementation in FIG. 6.

There are other resource models for virtualized environment such as that of VMware where a placement element does not contain a resource allocation—only a host. This is because in the VMware model each VM has specific fixed allocation bounds (minimum and maximum) for each of the resources included in the model. Those bounds are delivered to the hypervisor, which dynamically and automatically determines the exact allocation according to the demand of the VM. In such a model, the planner is not aware of the exact resource allocation assigned to each VM, only the bounds. Still, the same concepts of capacity limitations and compliance with policies apply. Additionally, the planning algorithm described here can be easily adapted to support such model. The main change is in the try_place( ) function 60 in FIG. 4, which actually evaluates placements. At line 4, the code may be modified to check that the sum of the minimum allocation bounds of the VMs placed at a host does not exceed the capacity of that host. The rest of the changes in the algorithm comprise the following:

a. removal of the rv part of the placement element—every "<h,rv>" pair should be replaced with "h"

b. replacement of the "Placement Element" type used in the algorithm with "Host" type c. removal of the REALLOCATE command generation code in prune_vm( ) 70 in FIG. 5, since this command is not applicable in a model with fixed bounds.

d. removal of step 1.1.2 (and its nested steps) from the 2nd abuse strategy (abuse by relocation) 96 in FIG. 7B.

The algorithm that underlies the present invention requires that both the current and the target placement be valid with respect to the set of policies P that is part of the input. This requirement is necessary to guarantee that the plan does not violate any policy p E P even temporarily, i.e., after the completion of each step. However, in real-world situations, a change of the policy set is frequently the cause for computing a new target placement and, subsequently, for realizing the new placement. Therefore, it is possible in a given data center that the current placement is NOT valid with respect to the input policies whereas the target placement is valid (the target placement should always be valid with respect to the policies since it is computed based on the policies as constraints). In such a case, it is impossible to guarantee complete policy non-violation in a sequential plan that operates on one VM at a time. However, the employed algorithm, if ending by returning a plan (as opposed to returning NO_PLAN) will still yield a plan for realizing the target placement starting at the current placement, but the non-violation guarantee should be replaced with the following two weaker requirements:

a. After every step of the plan, the number of violated policies/overloaded hosts will not increase; and b. At the end of the plan, no policies will be violated (since the placement will be the target placement).

In one embodiment, a user interacts with a GUI of a display device associated (either directly or remotely via e.g., a network) with a server or like computer device administering the VMPP method for virtual machine deployments in one or more host nodes. The plan that is the result of the VMPP method can then be executed per the user's commands at the GUI, either automatically, or manually (step-by-step) or even selectively, for expert users who are aware of the consequences of altering the original plans but who may want to alter the plan execution for purposes such as restraining the scope of the execution e.g., only to specific sectors of the data center.

Even though it may be possible to express VM dependencies induced by containing host capacity and policies as task dependencies, such dependencies could become very complicated and hard to reason upon with common task scheduling techniques. For example, if placing a VM v1 in a host h1 requires first migrating away some VMs so as to free enough VMs for v1 to be placed, then the task of placing v1 could depend on quite many possible subsets of tasks of handling all the VMs currently placed at h1 and that need to be migrated away.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded into a computer system, is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

More specifically, as shown in FIG. 1, a management server 20, which can be connected to a management client 30, and to a set of managed hosts with virtualization software ("hypervisors") 10, all connected using e.g., a network 15. The management server 20, in which the present VMPP invention is deployed, can be an actual physical computer connected directly or indirectly to the management client 30, or it can be a virtual machine on one of the managed hosts 10. The management client 30 can be an actual work-station consisting of a computer, a display and input devices such as keyboard and/or mouse. The management client can also be a software or hardware interface to a separate management product that could operate e.g., a larger scope of infrastructure, such as multiple data centers of the same organization or of different organizations. The management server, management client and managed hosts may run operating systems (O/S), such as Linux, MS Windows, Unix, Mac OS X, etc. The managed hosts need to run compatible hypervisor software such as products from VMware, Xen, KVM, Microsoft, or others.

The management server 20, management client 30 and managed hosts 12 in host environment 10 in FIG. 1 may additionally include: computer readable media, including a variety of types of volatile and non-volatile media, each of which can be removable or non-removable. For example, system memory includes computer readable media in the form of volatile memory, such as random access memory (RAM), and non-volatile memory, such as read only memory (ROM). The ROM may include an input/output system (BIOS) that contains the basic routines that help to transfer information between elements within computer device, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus by one or more data media interfaces (not shown). Alternatively, the hard disk drive, magnetic disk drive, and optical disk drive can be connected to the system bus by a SCSI interface (not shown), or other coupling mechanism. Although not shown, the computer 100 can include other types of computer readable media. Generally, the above-identified computer readable media provide non-volatile storage of computer readable instructions, data structures, program modules, and other data for use by computer. For instance, the readable media can store an operating system (O/S), one or more application programs, such as video editing client software applications, and/or other program modules and program data for enabling video editing operations via Graphical User Interface (GUI).

As mentioned, management server 20 is adapted to operate in a networked environment using logical connections to one or more computers, such as the server device that may include all of the features discussed above with respect to computer device, or some subset thereof. It is understood that any type of network can be used to couple the management server 20 with client management 30 and/or managed hosts 10, such as a local area network (LAN), or a wide area network (WAN) (such as the Internet). When implemented in a LAN networking environment, the server 20 connects to local network via a network interface or adapter 15. When implemented in a WAN networking environment, the server 20 connects to the WAN via a high speed cable/dsl modem or some other connection means. The cable/dsl modem can be located internal or external to computer, and can be connected via the I/O interfaces or other appropriate coupling mechanism. Although not illustrated, the management server, management client and managed hosts can provide wireless communication functionality for connecting.

The terms "management server", "host", "managed host", "management client", "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While it is apparent that the invention herein disclosed is well calculated to fulfill the advantages stated above, it will be appreciated that numerous modifications and embodiments may be devised by those skilled in the art, and it is intended that the appended claims cover all such modifications and embodiments as fall within the true spirit and scope of the present invention.

We claim:

1. A computer-implemented method for planning placement of virtual machines VMs in a computing environment comprising a set of hosting machines HMs, said method comprising:
    providing, at a computing device, a current placement function cp(v) representing a current placement of each of said virtual machines VMs v in one of said hosting machines HMs h;
    defining, at said computer device, a modifiable copy of said current placement function, mcp( )
    defining, at said computing device, a target placement function tp(v) representing a target placement of the virtual machines VMs in said HMs, one or more of said VMs and HMs having a set of policies and resource constraints associated therewith; and,
    constructing, at said computer device, a graph comprising VM v nodes interconnecting HM h nodes via edges for modeling a current and target deployment states of said VMs;
    iterating over said HM and VM nodes of said graph and gradually modifying said mcp( ) placement function to resemble the target placement function; and
    generating, from said iterating, an ordered sequence of VM placement change instructions comprising a plan for changing the current placement of said virtual machines VMs v according to said target placement function tp(v) without violating said associated set of policies and resource constraints, after completion of each of said iterating; and,
    generating, for output at said computing device, said plan for placing said virtual machines VMs v at said host machines HMs;
    wherein said graph is a bipartite directed graph, said graph constructing comprising:
    adding edges to said graph, said edges including: an edge (h, v) for every current placement of said VM v at said HM h with resource allocation rv, and an edge(v, h) for every target placement of said VM v at said HM h with said resource allocation rv.

2. The computer-implemented method as claimed in claim 1, wherein said constructing a graph further comprises:
    determining, at said computer device, whether a VM's placement does not change between the current and the target placement (cp(v)=tp(v));
    removing VM v's node whose placement does not change from said graph;
    preemptively detecting VM v nodes having a target placement that is off a hosting machine (tp(v)=NULL) and removing those VMs from the graph; and,
    appending, to the resulting plan, an instruction for un-placing those VMs to free more resources at the HMs; and,
    removing HM h nodes that have no pending VM v nodes from said graph.

3. The computer-implemented method as claimed in claim 2, wherein said generating the plan from said iterating over the said graph's nodes comprises:
    Iterating until no more placement changes can be performed; and,
    performing subsequent internal iterations over only the HM nodes whose placement of VMs has changed in the previous iteration; and
    for each HM h, iterating over all the incoming edges (v, h) and determining whether a VM v can be placed at its target placement tp(v), and,
    if a VM v can be placed at its target placement tp(v), pruning the node of VM v from the graph; and,
    after iterating over said HMs and edges, pruning all the HM nodes that have become devoid of incoming edges.

4. The computer-implemented method as claimed in claim 3, further comprising:
    determining existence of a deadlock where multiple pending VMs prevent each other from reaching the target placement;
    handling the deadlocks if so determined; and
    if there are no deadlocks and all the VMs are pruned, completing the plan computation and returning the plan.

5. The computer-implemented method as claimed in claim 3, further comprising:
    determining whether a VM v can be placed at either a host HM h with resource allocation rv or, at no-host, said determining comprising:
    constructing a hypothetical placement function cp'( ) that is identical to said mcp( ) wherein cp'(v)=<either (h, rv) or @, respectively>; and
    determining whether policies associated with either VM v's current host h' or with h, or associated with v itself, are not violated by cp'( ) by evaluating whether each policy p evaluates p(cp') to TRUE indicating no violation or FALSE indicating a violation; and
    determining whether the capacity of h is not exceeded by a placement change of v.

6. The computer-implemented method as claimed in claim 4, wherein said pruning a node VM v from the graph comprises:
    removing the node VM v from the graph;
    removing the incoming and outgoing edges of node VM v from the graph;
    generating a placement change instruction for VM v and appending it to the plan; and
    updating the mcp( ) placement function such that mcp(v) =tp(v) such that VM v is placed at its target placement.

7. The computer-implemented method as claimed in claim 6, where said generating a placement change instruction for a VM v comprises:
    generating a "PLACE" operation for a VM v whose current placement mcp(v) is off-host and that its target placement tp(v) is on a host;
    generating a "REALLOCATE" operation for a VM v whose both current placement mcp(v) and target placement tp(v) are on the same host; or generating a "RELOCATE" operation for a VM v whose current placement mcp(v) is on a first host h1 and that its target location is on a different host h2.

8. The computer-implemented method as claimed in claim 6, wherein said pruning of a node HM h comprises:
removing the node HM h from the graph; and
removing the outgoing edges (h, v) of node HM h; and
removing the node HM h from the set of scanned hosts.

9. The computer-implemented method as claimed in claim 8, wherein said determining whether a deadlock exists and said handling deadlocks comprises:
checking for existence of still un-pruned VMs in the graph and no more hosts left to process indicating no host had the placement mcp( ) of some of its currently-placed VMs changed in a prior iteration, and, declaring a deadlock if this situation exists; and
determining whether some placement of VMs has been made in any iteration, or not; and,
one of: repeating the entire stage of iterating over processing the hosts to handle policies that enforce placement change order between VMs on different hosts if some placement of VMs has been made; or
if no placement change has been made in any iteration, performing an abusing attempt to break a migration cycle of said VMs by selecting a candidate VM that is suitable for being abused according to an employed abuse strategy, and if an abusing attempt fails, declaring a global plan computation failure by returning NO_PLAN; otherwise, if an abusing attempt succeeds, continuing said iterations.

10. The computer-implemented method as claimed in claim 9, wherein said attempting to abuse a particular VM v comprises:
attempting to change the placement of v so that it will release the resources allocated to it on its current host, in order to facilitate breaking the migration cycle that VM v is involved in and allow other VMs in the cycle to reach their target placement; and
if said attempting is successful, generating a placement change instruction for v's abuse and appending it to the plan; and
maintaining VM v's target placement unchanged to enable eventual placement of v at its target placement.

11. The computer-implemented method as claimed in claim 10, wherein said attempting to abuse a particular VM v comprises:
selecting a candidate VM v that is currently placed at a host that is allowing suspension of its operation; and
attempting to abuse the VM v by trying to un-place it and appending an appropriate "UNPLACE" operation in the plan if VM v can be un-placed.

12. The computer-implemented method as claimed in claim 10, wherein said attempting to abuse a particular VM v comprises:
selecting a candidate VM v that is currently placed at a host; and
attempting to abuse the VM v by trying to relocate it to a host that is outside the graph and therefore outside the migration cycles out of a pool of host machines; and
appending an appropriate "RELOCATE" operation in the plan if VM v can be relocated.

13. The computer-implemented method as claimed in claim 9, further comprising:
applying an optimization, when there are no special policies being used, to enforce placement change order between VMs with different target hosts, said optimization comprising:
immediately placing all pending VMs of a HM h whose out degree is 0 (out(h)==0) at their target placement; and
preventing repeating of said iterating over the hosts more than once; and
upon detection of a deadlock, abusing is immediately attempted.

14. The computer-implemented method as claimed in claim 13, wherein plan generating includes iterating over an outer loop under control of a variable upon determining that previous loop iterations has made progress, said method further comprising:
applying an optimization in support of said special policies, which enforce placement change order between VMs with different target hosts, said optimization comprising one of:
adding edges between nodes of VMs that are associated with common special policies; and
checking for additional incoming edges from other VM nodes and adding representations of their target hosts to a variable ND; or
for each two VMs v1 and v2 that are associated with an identical special policy, adding an edge from the target HM of v1 to v2, whereby said directed graph remains bi-partite; and
removing said outer loop and said variable that controls it.

15. The computer-implemented method as claimed in claim 12, further comprising:
providing support to a resource model having an exact current allocation and target allocation of any VM not known to a planner, each VM being assigned a fixed range for each resource, from which a host control device at the host dynamically assigns resources to the VM placed on the host, said method Per comprising:
a. evaluating each said VM v placement, said evaluating including checking that a sum of the minimum allocation bounds of the VMs placed at a host does not exceed the capacity of that host;
b. ignoring or removing the resource allocation part of placement elements
c. removing a REALLOCATE command.

16. The computer-implemented method as claimed in claim 12, wherein a current placement is not valid with respect to either the policies or capacity limitations of a host, said method further comprising:
a. preventing an increase of the number of violated policies after every step of the plan; and
b. preventing any violation of a special policy at an end of the plan, as the target placement will be reached.

17. A system for dynamically managing placement of virtual machines VMs and associated resources in a networked computing environment comprising a set of physical hosting machines HMs, said system comprising:
memory storage device accessible by a server device for storing configuration of host machines and virtual machines in said computing environment and storing a set of policies and resource constraints associated therewith, and storing a current placement function cp(v) representing a current placement of each virtual machine VM v in one of said hosting machines HMs h;
a management server, receiving information from said memory storage device and including a processing device executing logic for:
defining a modifiable copy of said current placement function, mcp( );
defining a target placement function tp(v) representing a target placement of the virtual machines VMs in said HMs, one or more of said VMs and HMs having the set of policies and resource constraints associated therewith; and, constructing a graph comprising VM v nodes interconnecting HM h nodes via edges for modeling a current and target deployment states of said VMs;

iterating over said HM and VM nodes of said graph and gradually modifying said mcp( ) placement function to resemble the target placement function tp(v); and generating, from said iterating, an ordered sequence of VM placement change instructions comprising a plan for achieving said target placement function tp(v) without violating said associated set of policies and resource constraints, after completion of each of said iterating; and, means for communicating, over a network, to said set of physical hosting machines HMs in said computing environment, said plan for placing said virtual machines VMs v at said host machines HMs in said computing environment;

wherein said graph is a bipartite directed graph, said constructing a graph comprising:

adding edges to said graph, said edges including:

an edge(h, v) for every current placement of said VM v at said HM h with resource allocation rv, and an edge(v, h) for every target placement of said VM v at said HM h with said resource allocation rv.

18. The system as claimed in claim 17, wherein said constructing a graph further comprises:

determining whether a VM node does not change (cp(v) =tp(v));

removing VM v nodes from said graph whose placement does not change;

preemptively detecting VM v nodes having a target placement that is off a hosting machine (tp(v)=NULL) and removing those VMs from the graph; and, appending, to the resulting plan, an instruction for un-placing those VMs to free more resources at the HMs; and, removing HM h nodes that have no pending VM v nodes from said graph.

19. The system as claimed in claim 18, wherein said generating the plan from said iterating over the said graph's nodes comprises:

iterating until no more placement changes can be performed; and, performing subsequent internal iterations over only the HM nodes whose placement of VMs has changed in the previous iteration; and for each HM h, iterating over all the incoming edges (v, h) and determining whether a VM v can be placed at its target placement tp(v), and, if a VM v can be placed at its target placement tp(v), pruning the node of VM v from the graph; and, after iterating over said HMs and edges, pruning all the HM nodes that have become devoid of incoming edges.

20. The system as claimed in claim 19, wherein said generating the plan from said iterating over the said graph's nodes comprises:

determining existence of a deadlock where multiple pending VMs prevent each other from reaching the target placement;

handling the deadlocks if so determined; and if there are no deadlocks and all the VMs are pruned, completing the plan computation and returning the plan.

21. The system as claimed in claim 20, wherein said pruning a node VM v from the graph comprises:

removing the node VM v from the graph;

removing the incoming and outgoing edges of node VM v from the graph;

generating a placement change instruction for VM v and appending it to the plan; and updating the mcp( ) placement function such that mcp(v)=tp(v) such that VM v is placed at its target placement.

22. The system as claimed in claim 21, where said generating a placement change instruction for a VM v comprises:

generating a "PLACE" operation for a VM v whose current placement mcp(v) is off-host and that its target placement tp(v) is on a host;

generating a "REALLOCATE" operation for a VM v whose both current placement mcp(v) and target placement tp(v) are on the same host; or generating a "RELOCATE" operation for a VM v whose current placement mcp(v) is on a first host h1 and that its target location is on a different host h2.

23. A computer program product for planning placement of virtual machines VMs in a computing environment comprising a set of hosting machines HMs, the computer program product comprising:

a memory having computer usable program code embodied therewith, the computer usable program code comprising:

computer usable program code configured to provide, at a computing device, a current placement function cp(v) representing a current placement of each virtual machine VM v in one of said hosting machines HMs h;

computer usable program code configured to define, at said computer device, a modifiable copy of said current placement function, mcp( );

computer usable program code configured to define, at said computing device, a target placement function tp(v) representing a target placement of the virtual machines VMs in said HMs, one or more of said VMs and HMs having a set of policies and resource constraints associated therewith; and, computer usable program code configured to construct, at said computer device, a graph comprising VM v nodes interconnecting HM h nodes via edges for modeling a current and target deployment states of said VMs;

computer usable program code configured to iterate over said HM and VM nodes of said graph and gradually modifying said mcp( ) placement function to resemble the target placement function; and computer usable program code configured to generate, from said iterating, an ordered sequence of VM placement change instructions comprising a plan for changing the current placement of said virtual machines VMs v according to said target placement function tp(v) without violating said associated set of policies and resource constraints, after completion of each of said iterating; and, computer usable program code configured to generate, for output at said computing device, said plan for placing said virtual machines VMs v at said host machines HMs;

wherein said graph is a bipartite directed graph, said graph constructing comprising:

adding edges to said graph, said edges including: an edge (h, v) for every current placement of said VM v at said HM h with resource allocation rv, and an edge(v, h) for every target placement of said VM v at said HM h with said resource allocation rv.

* * * * *